United States Patent
Zakirov et al.

(10) Patent No.: US 10,383,461 B2
(45) Date of Patent: Aug. 20, 2019

(54) SYSTEM OF CONTROL AND IDENTIFICATION OF GOODS IN A SHOP

(71) Applicants: Timur Zakirov, Moscow (RU); Sergey Ilchenko, selo Angelovo (RU)

(72) Inventors: Timur Zakirov, Moscow (RU); Sergey Ilchenko, selo Angelovo (RU); Rinat Osmanov, Moscow (RU)

(73) Assignees: Timur Zakirov (RU); Sergey Ilchenko (RU)

( * ) Notice: Subject to any disclaimer, the term of this patent is extended or adjusted under 35 U.S.C. 154(b) by 0 days.

(21) Appl. No.: 16/106,314

(22) Filed: Aug. 21, 2018

(65) Prior Publication Data
US 2019/0069695 A1    Mar. 7, 2019

(30) Foreign Application Priority Data
Sep. 1, 2017  (RU) ................................ 2017130893

(51) Int. Cl.
| | |
|---|---|
| *G06K 7/00* | (2006.01) |
| *A47F 9/04* | (2006.01) |
| *B62B 3/14* | (2006.01) |
| *G06K 9/00* | (2006.01) |
| *G06Q 20/20* | (2012.01) |

(52) U.S. Cl.
CPC ............... *A47F 9/048* (2013.01); *B62B 3/14* (2013.01); *G06K 9/00671* (2013.01); *G06Q 20/204* (2013.01); *G06Q 20/208* (2013.01)

(58) Field of Classification Search
USPC ................. 235/375–385, 435, 439, 454, 462
See application file for complete search history.

(56) References Cited

U.S. PATENT DOCUMENTS

| | | | | |
|---|---|---|---|---|
| 2014/0214577 | A1* | 7/2014 | Acker, Jr. ............ | G07G 1/0081 705/23 |
| 2015/0287246 | A1* | 10/2015 | Huston .................. | G06T 17/00 345/420 |
| 2015/0294431 | A1* | 10/2015 | Fiorucci ................ | G06Q 50/26 705/13 |

FOREIGN PATENT DOCUMENTS

WO    WO-2009116954 A2 *   9/2009   ............. G06Q 30/06

* cited by examiner

*Primary Examiner* — Matthew Mikels
(74) *Attorney, Agent, or Firm* — Nadya Reingand; Yan Hankin

(57) ABSTRACT

The invention relates to a product identification system when the goods are purchased by a buyer in a self-service store. The product identification system in the self-service store includes a scanning device, a goods collecting device with an individual identification number, a camera, at least one self-service payment terminal and a server. The scanning device reads the identification number, scans the barcodes of goods, creates a list of goods and a resulting barcode. The camera is installed on the goods collecting device and reads images of the goods and tracks its movement. The terminal sends information to the server, wherein the server receives and analyzes information from the camera and terminal. In case when the information from the camera and from the resulting barcode coincide, the buyer pays for the purchase, and receives a check.

18 Claims, 1 Drawing Sheet

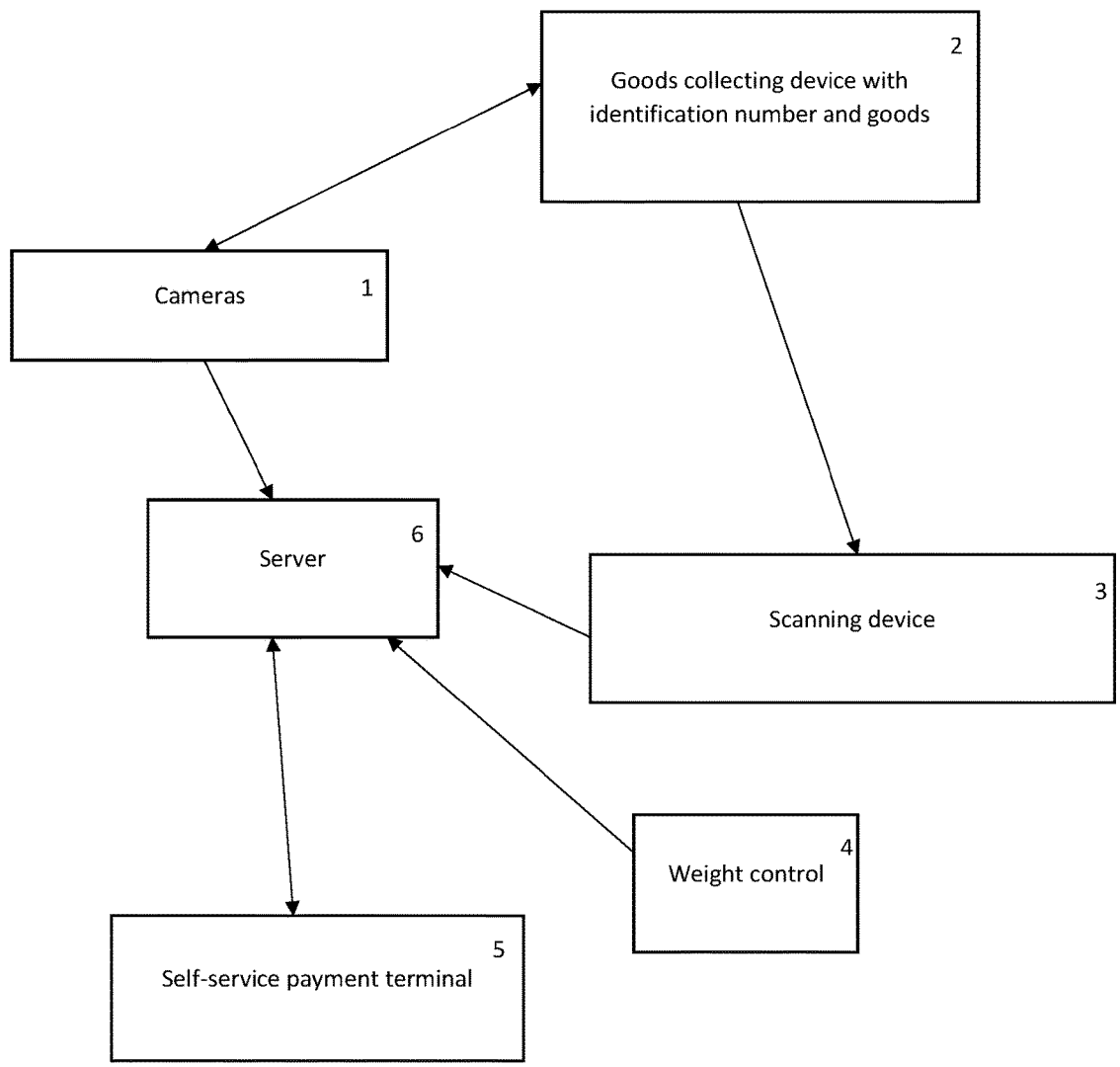

SYSTEM OF CONTROL AND IDENTIFICATION OF GOODS IN A SHOP

CROSS REFERENCE TO RELATED APPLICATIONS

The present patent application claims priority to Russian patent application RU2017130893 filed Sep. 1, 2017.

FIELD OF THE INVENTION

The invention relates to a commodity identification system in which a customer purchases a product in a store through self-service.

BACKGROUND

Now there are a large number of automated shops for shopping. At the same time, there is a problem of trusting the customer to scan the goods in the sale area. There is the possibility of scanning one product, and placing another product in the collection facility (cart, basket, etc.).

There is a known device for controlling the basket and for other trays used in self-service. The device is designed for cash service and identification of the trolley. The device includes stationary sensors and an electrical control unit connected to each other, a television camera, and a monitor for displaying the captured image of a television camera of a criminal (DE 29924642, Apr. 11, 2004, A47F9/04).

This patent provides a cash register; the camera is designed to display images of the goods in the basket for the cashier at the cash register to determine the emptiness of the basket. This system is designed to speed up the customer's service by the cashier.

There is an intelligent trolley equipped with handrails, a basket, and a control panel mounted on a trolley. The control panel displays in high resolution. The camera is mounted on the control panel at the top. The bar code scanner and the storage basket are equipped with a weighing sensor for weighing the basket. The camera, bar code scanner, and weighing sensor, respectively, are connected to the control panel (CN 206012641, published on Mar. 15, 2017, B62B3/02).

The disadvantages of these technical solutions include the fact that they do not have a security system, namely the ability to scan one product, and place in the collection point a different product, or using a double-trolley.

In addition, the drawbacks of the above technical solutions include the use of only one camera, which can be manipulated in such a way that its function becomes impossible. The described cameras do not provide for the possibility of determining the depth of field, which would allow determining the visual image of the goods, and comparing it with the bar code indicated on the product, thereby comparing the correctness of the scanned item and the item taken to the collection point.

In addition, a system for performing payment at a sales point using a user's mobile device is known in the art. The system contains information about the user's account, this information containing the user account ID and the transaction identifier and one or more processors for: receiving through the payment service provider's server; making payments for a financial transaction involving goods selected in the trading company; receiving information about registration from the user through the payment service provider's server; receiving information from the transaction identifier captured by the user's mobile device; determining and processing detailed financial transaction data based on the received information from the transaction identifier captured by the user's mobile device; transfer of approval of payment to the trading company (RU 2604671, published on Oct. 12, 2016, G06Q 20/00).

At the same time, an automated means for selling goods is known, in which it is controlled by scanning purchases and ensuring the delivery of scanned items by means of a switchgear to the customer. The cost of the product is summed up with the cost of selected and delivered items of retail trade. The buyer makes a single payment, both for the selected product, and for selected and delivered retail items. The equipment in accordance with the invention requires a small estimated area/total area of premises, slightly increases labor input, allows a release in any direction and is combined with almost any existing service system (RU 2266561, published on May 27, 2005, G06F 17/60).

The disadvantage of the described system is the exclusion of the possibility of re-checking the scanned goods, as this system has a complex structure, the distribution of goods by commodity groups and excluded the possibility of scanning the goods not in a specially designated place, and checking the substitution of cheap goods with expensive counterparts.

SUMMARY

It is an object of the present invention to provide a product identification system that, when using a self-service system, controls a scanned item in a product collection device.

The technical result of the claimed invention consists in the creation of a system for the control and identification of goods in self-service by the buyer in the store's trading floor.

The claimed technical result is achieved by the fact that the product identification system in the self-service store includes a scanning device connected to each other, a device for collecting goods, a camera, at least one self-service payment terminal and a server. The device for collecting goods is assigned an individual identification number. The scanning device is equipped with an application that allows you to read the indicated number of devices in which goods are collected, scan the bar codes of goods, create a list of selected goods and the resulting bar code. The camera is installed on the device for collecting goods and is designed to read a visual image of the goods and track its movement after scanning the barcode. The payment terminal is made with the possibility of feedback to the server. The said server is configured to receive and analyze information from said cameras and a payment terminal.

In a particular case of the system, a scanner, phone or tablet is used as a scanning device; the cameras are made in an anti-vandal case; as a device for collecting goods using a cart or basket; The system includes weight control at the place of payment for the goods; The cameras are also installed in the store's sales area; cameras can be configured to determine the depth of field; On the collection facility, sensors can be additionally installed to determine the depth of field; The scanning device may be located on the product collection device.

Also, the said technical result is achieved by applying a method of automated sale of goods in a self-service store, comprising the use of the product identification system described above. In this case, the buyer activates the application on the scanning device, selects the means for collecting the goods, reads the indicated number through the scanning device, scans the barcodes of the selected goods, thus forming a shopping list, disposes of the specified goods in the device for collecting goods. Then—transfers the final barcode created by means of the scanner to the self-service payment terminal reader, pays the purchase, and receives a check.

BRIEF DESCRIPTION OF THE DRAWINGS

The claimed invention is illustrated by the graphical representation shown in the FIG. 1.

DETAILED DESCRIPTION OF THE PREFERRED EMBODIMENT

The declared system of product identification works as follows.

The buyer, when entering the store's trading floor, takes a cart or a basket (device for collecting goods) that have their own identification number. At the entrance to the store, the buyer activates the application, and using the scanning mobile device (phone, tablet, scanner) reads the identification number of the trolley or basket, and the mobile device or application is assigned the number of the cart or basket.

The product identification system in the self-service store includes a mobile device (for example, a scanner, phone, or tablet) that is capable of scanning a barcode from the goods connected through an internal wireless store network. The cameras are located on a cart or basket. Each trolley has its own identification number, which does not coincide with other numbers of trolleys or baskets.

If the buyer uses a personal mobile device, a scanning barcode (for example, a phone or tablet), the mobile device is attached via software and a wireless network to the collection device. A mobile device can be located on a cart, basket or be a separate unit mounted on a cart.

In addition, said cameras can be configured to scan the goods.

When the customer scans the bar code printed on the product, the cameras located on the product collection device or located in the store room identify the visual image of the product and track its placement in the collection device. Information is entered into a temporary virtual check (virtual shopping cart, application, mobile device memory or store server). The visual image of the goods identified by the cameras is tied to the shopping list in the device for collecting the goods. At the end of the collection of goods (the completion of the purchase), the mobile application in the mobile device generates a final shopping list and outputs the resulting bar code, CR code or NFS. The buyer, when approaching the automatic ticket office, transmits from the mobile device the generated shopping list to the cash register reader using a bar code (CR code or NFS). The automatic register receives from the mobile device application the buyer's shopping list, passes to the store server. The store server checks information about the visual images received from the cameras and information received from the automatic cash register. If the product nomenclature coincides, the information from the server is returned to the automatic cash register and payment terminal. The buyer pays for the purchase and receives a cash receipt.

Cameras that read the image of the product and track its movement after scanning the bar code can be installed not only on the cart, basket, but also in the store's sales area. In this case, the cameras can be configured to determine the depth of field for determining a three-dimensional image. In the event that cameras do not have the ability to determine the depth of field, additional sensors or laser modules (not shown graphically) can be installed in the collection facility.

To maintain functionality, the camera can be made in an anti-vandal casing. The information from the mobile device scanning the bar code on the goods goes to the server of the store. In this case, the information received from the cameras that identify the goods, also arrives at the server. The server checks and processes the information received, namely, whether the bar code received by the scanning mobile device that reads the barcode matches with the visual image obtained from the cameras. In addition, the system may include a weight control located at the place of payment for the goods. A trolley or basket is mounted on a scale that weights the total weight of the goods and sends this information to the server. The server processes the received information from the bar code scanner (mobile device), cameras, and weights, compares the information received and, in case of a match of all parameters, the buyer in the payment terminal can pay the goods.

What is claimed is:

1. A product identification system in a self-service store, including:
    a connected scanning device,
    a goods collecting device,
    a camera installed on the connected scanning device,
    at least one self-service payment terminal and a server,
    wherein each goods collecting device is assigned an individual identification number,
    wherein the scanning device is equipped with an application that allows for reading the individual identification number of the goods collecting device, scanning bar codes of goods, and creating a list of selected products and a resulting barcode,
    wherein one or more additional cameras are installed on the goods collecting device and are configured to read a visual image of a good within the goods collecting device and track its movements after scanning its barcode,
    wherein the payment terminal is configured to give feedback to the server,
    wherein the server is configured to receive and analyze information from the camera installed on the connected scanning device, the one or more additional cameras installed on the goods collecting device, and the payment terminal, to confirm matching of goods detected by each of said cameras and said payment terminal.

2. The system of claim 1, wherein the scanning device is a scanner, a telephone or a tablet.

3. The system according to claim 1, wherein the cameras are made with an anti-vandal casing.

4. The system according to claim 1, wherein the goods collecting device is a trolley or a basket.

5. The system according to claim 1, further comprising a weight control at the payment terminal.

6. The system according to claim 1, wherein store cameras are installed in the store's sales area.

7. The system of claim 1, wherein one or more of the cameras are configured to determine a depth of field.

8. The system according to claim 1, wherein sensors for determining a depth of field are additionally mounted on the goods collecting device.

9. The system of claim 1, wherein the scanning device is located on the goods collecting device.

10. A method for an automated sale of goods in a self-service store, comprising a use of a product identification system according to claim 1, wherein a buyer activates an application on a scanning device, selects a goods collecting device, reads an individual identification number through the scanning device, scans barcodes of selected goods, thereby forming a shopping list, disposes of the goods in the goods collecting device, then transmits a final barcode created by the scanner to a self-service payment terminal reader, pays a purchase, and receives a check.

11. The method of claim 10, wherein the scanning device is a scanner, a telephone or a tablet.

12. The method of claim 10, wherein the cameras are made with an anti-vandal casing.

13. The method of claim 10, wherein the goods collecting device is a trolley or a basket.

14. The method of claim 10, further comprising a weight control at the payment terminal.

15. The method of claim 10, wherein store cameras are installed in the store's sales area.

16. The method of claim 10, wherein one or more of the cameras are configured to determine a depth of field.

17. The method of claim 10, wherein sensors for determining a depth of field are additionally mounted on the goods collecting device.

18. The method of claim 10, wherein the scanning device is located on the goods collecting device.

* * * * *